United States Patent
Tressler et al.

(10) Patent No.: US 6,281,666 B1
(45) Date of Patent: *Aug. 28, 2001

(54) EFFICIENCY OF A MULTIPHASE SWITCHING POWER SUPPLY DURING LOW POWER MODE

(75) Inventors: Chris Tressler; Carl Hernandez; Mary Chen, all of Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/523,107

(22) Filed: Mar. 14, 2000

(51) Int. Cl.$^7$ .......................................... G05F 1/40
(52) U.S. Cl. .......................... 323/272; 323/284; 363/65
(58) Field of Search .................... 323/272, 268, 323/284, 212, 285; 363/54, 56, 65, 37, 71, 50

(56) References Cited

U.S. PATENT DOCUMENTS

| | | | |
|---|---|---|---|
| 4,270,165 | * 5/1981 | Carpenter et al. | 363/65 |
| 6,031,747 | 2/2000 | Llic et al. | |
| 6,055,167 | * 4/2000 | Shamkovich et al. | 363/52 |
| 6,137,274 | 10/2000 | Rajagopalan | |
| 6,144,194 | 11/2000 | Varga | |

OTHER PUBLICATIONS

"Soft–Switching PWM Techniques and Their Applications", Hua, et al., The European Power Electronics Association, Sep. 13, 1993, pp. 87–92.

"Comparative Study on Paralleling Schemes of Converter Modules for Distributed Power Applications", Choi, IEEE-Transactions on Industrial Electronics, vol. 45, No. 2, Apr., 1998, pp. 194–199.

"Investigation of Candidate VRM Topologies for Future Microprocessors", Zhou, et al., APEC 98, IEEE, US, Feb. 15, 1998, pp. 145–150.

International Search Report, International application number PCT/US00/31957, mailed Feb. 19, 2001.

* cited by examiner

Primary Examiner—Peter S. Wong
Assistant Examiner—Rajnikant D. Patel
(74) Attorney, Agent, or Firm—Conley, Rose & Tayon, PC; B. Noel Kivlin

(57) ABSTRACT

A multiphase power supply that minimizes losses during a low power mode+. In a particular embodiment, a multiphase power supply may include a plurality of switching regulators coupled in parallel with respect to one another. The multiphase power supply further comprises a phase control circuit coupled to each of the switching regulators. The phase control circuit is configured to generate a plurality of control signals for controlling the switching of the switching regulators so that they are out of phase with respect to one another. During the low power mode of operation of the microprocessor, the phase control circuit is configured to selectively suspend operation of a subset of switching regulators by removing or disabling at least one of the plurality of control signals to each of the subset of switching regulators.

27 Claims, 5 Drawing Sheets

EFFICIENCY OF A MULTIPHASE SWITCHING POWER SUPPLY DURING LOW POWER MODE

BACKGROUND OF THE INVENTION

1. Field of the Invention

The present invention relates to the field of power supplies, and more particularly to multiphase switching power supplies.

2. Description of the Related Art

Power supplies are used in various types of devices. There are many specialized types of power supply circuits with various advantages and disadvantages. Microprocessors in computers may require a power supply circuit that regulates a high level of current while maintaining a high level of efficiency.

One such type of specialized power supply circuit is a switching regulator. Switching regulators typically provide an output with a lower voltage than the unregulated input while at the same time providing an output with a higher current than the current drawn from the unregulated supply. This is accomplished by a passive transistor that is constantly switching between the saturation mode and the nonconducting mode. Because the passive transistor is either in saturation or not conducting, there is very low power dissipation. A switching regulator therefore can regulate a high amount of current at a high efficiency rate.

A disadvantage with switching regulators is known as the "ripple effect." The ripple effect refers to ripples that are periodic variations in the output voltage that have to be smoothed out in order to generate a genuine DC current. The ripple effect problem may be reduced or eliminated by coupling multiple switching regulators in parallel and operating them such that they are out of phase with respect to one another. This configuration is known as a multiphase switching regulator. A multiphase switching regulator typically produces a high current output with high efficiency while at the same time reducing ripple. Consequently, a multiphase switching regulator is a popular choice for use in a power supply circuit where high levels of current and efficiency are desired.

Many microprocessors are configured to selectively operate in a low power mode of operation. During low power mode, the microprocessor may be configured to power down certain functional blocks (e.g. those that are inactive) and/or reduce the frequency of its internal clock(s). Powering down certain portions of the microprocessor and/or reducing clocking frequencies may advantageously reduce power consumption. When the microprocessor returns to a normal mode of operation, the microprocessor draws relatively higher amounts of current.

Unfortunately, when the microprocessor is operating in low power mode, a multiphase switching regulator becomes more inefficient as a percentage of the total current generated. This is because the transistors in the switching regulators continue to switch at the same frequency as during the normal mode of operation. Since the transistors are switching at the same frequency, the capacitive losses associated with the switching are the same during the low power and normal modes of operation. However, since less current is drawn during the low power mode of operation, the switching becomes more inefficient as a percentage of the total current generated. Therefore, an improved multiphase power supply circuit is desired that will lower switching-related power losses during low power modes of operation.

SUMMARY OF THE INVENTION

The problems outlined above may in large part be solved by a power supply that lowers power losses during a low power mode of operation. In one embodiment, a multiphase power supply includes a plurality of switching regulators coupled in parallel with respect to one another. Each switching regulator may operate concurrently, and each may be controlled out of phase with respect to one another. In a particular embodiment, each switching regulator may be a synchronous switching regulator. The multiphase power supply further includes a phase control circuit coupled to the plurality of switching regulators. The phase control circuit is configured to selectively suspend operation of at least one of the switching regulators during a low power mode of operation. The phase control circuit may further be configured to control the switching of the switching regulators so that they are out of phase with respect to one another.

Various embodiments of the multiphase power supply may advantageously allow for relatively high current capabilities during a normal mode of operation, while minimizing losses during the low power mode of operation. By suspending operation of a subset of switching regulators during the low power mode of operation, capacitive switching losses associated with the transistors of the suspended switching regulators may be eliminated. Therefore, overall efficiency of the power supply may be improved.

BRIEF DESCRIPTION OF THE DRAWINGS

A better understanding of the present invention can be obtained when the following detailed description of the preferred embodiment is considered in conjunction with the following drawings, in which.

Figure 1:
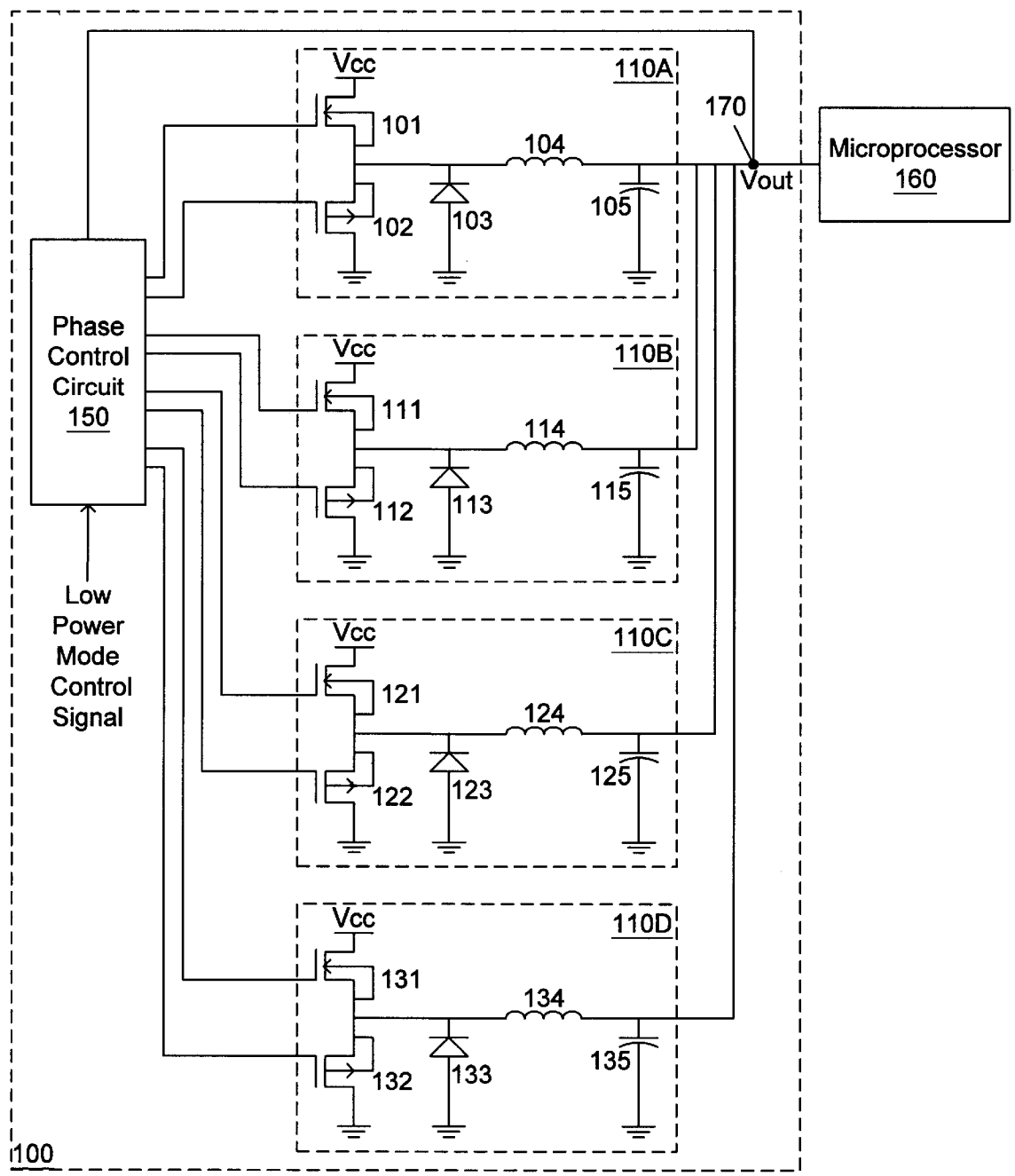
FIG. 1 illustrates a particular embodiment of a multiphase power supply.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 illustrates a particular embodiment of a multiphase power supply 100. Multiphase power supply 100 comprises a plurality of synchronous switching regulators designated as 110A, 110B, 110C and 110D. Synchronous switching regulators 110A–D may, individually or collectively be referred to as switching regulator 110 or switching regulators 110, respectively. Switching regulators 110 are coupled to provide power to a microprocessor 160 at node 170. Multiphase power supply 100 further comprises a phase control circuit 150 coupled to each of switching regulators 110. It is important to note that different embodiments may comprise more or less than four switching regulators.

In the illustrated embodiment each switching regulator 110 includes a pair of transistors (e.g., transistors 101 and 102, transistors 111 and 112, etc.) coupled between a power supply terminal Vcc and ground. Each switching regulator 110 further includes a diode (e.g., diodes 103, 113, etc.), an inductor (e.g. inductors 104, 114, etc.) and a capacitor (e.g., capacitors 105, 115, etc.). It is noted that other specific circuit arrangements may be employed to implement each switching regulator 110.

Phase control circuit 150 is configured to generate a plurality of control signals for controlling the states of the transistors in switching regulators 110 such that the switching regulators 110 operate out of phase with respect to one another. In a particular embodiment, phase control circuit 150 may include a Semtech SC1144 integrated circuit. As will be described in further detail below, phase control circuit 150 also includes further circuitry to selectively suspend operation of a subset of switching regulators 110 during a low power mode of operation to thereby allow for improved efficiency.

Figure 2:
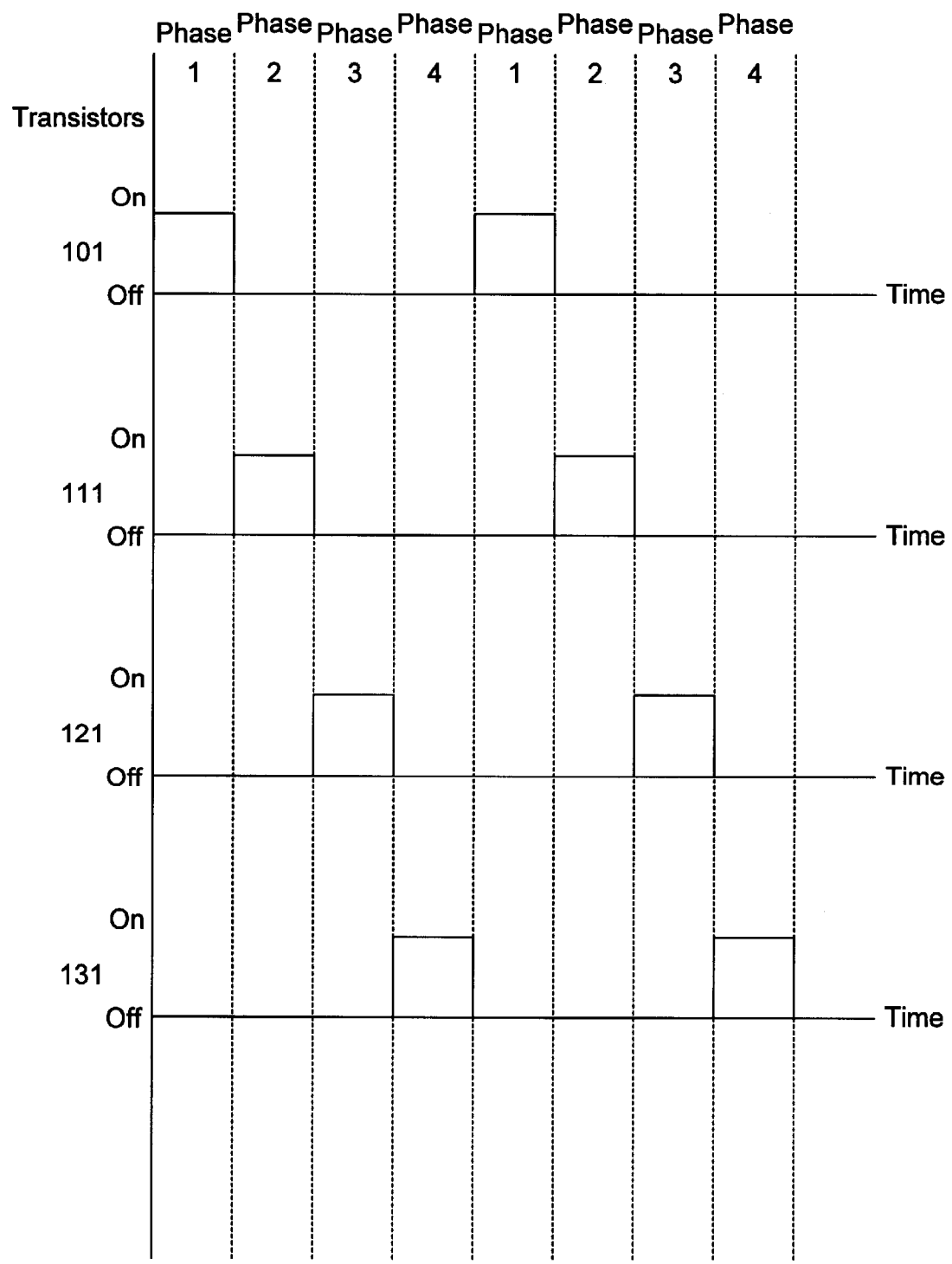
FIG. 2 is a timing diagram illustrating the duty cycles of selected transistors of FIG. 1 during a normal mode of operation.
Figure 3:
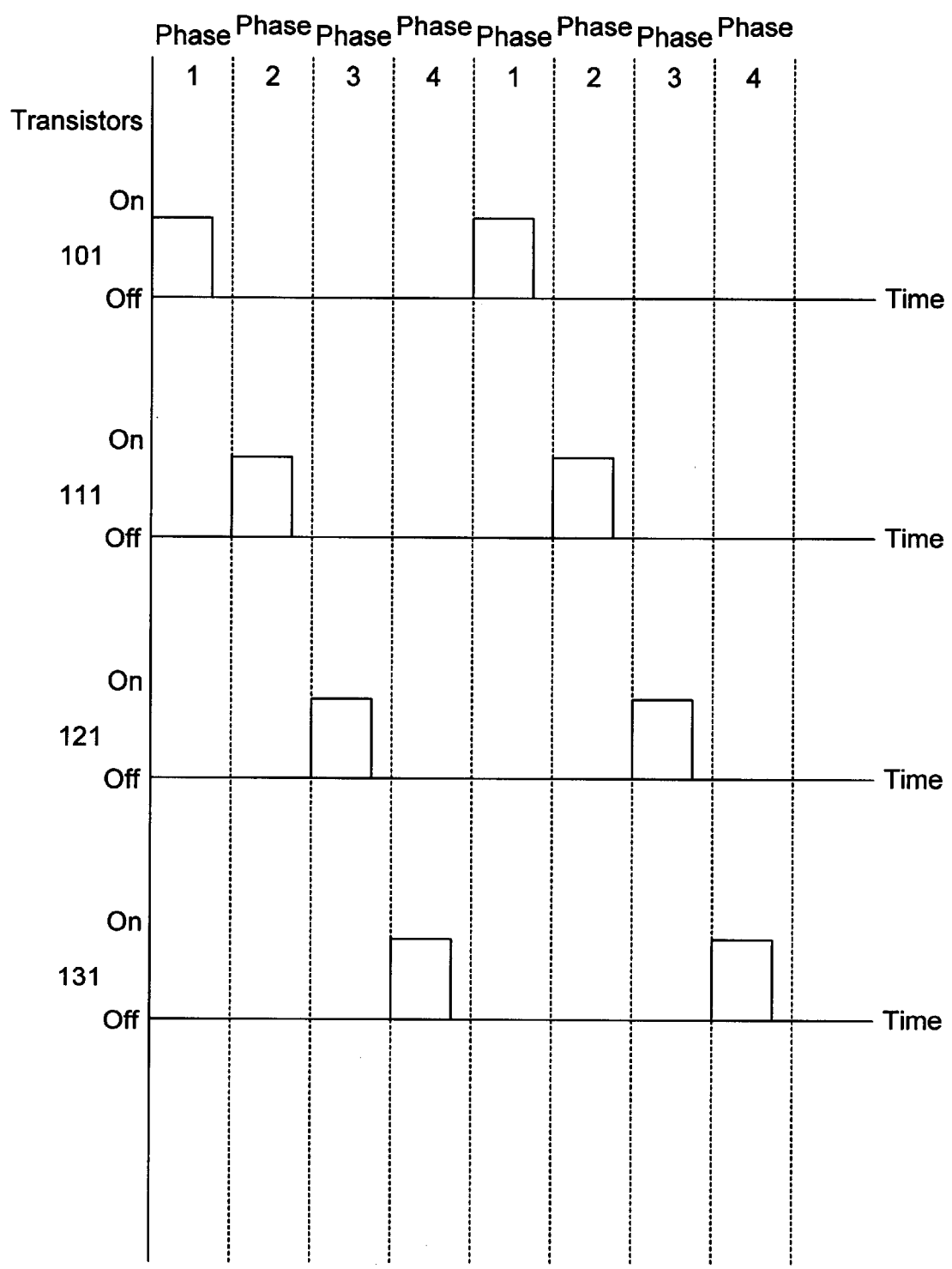
FIG. 3 is a timing diagram illustrating reduced duty cycles of selected transistors of FIG. 1 during a normal mode of operation.
Figure 4:
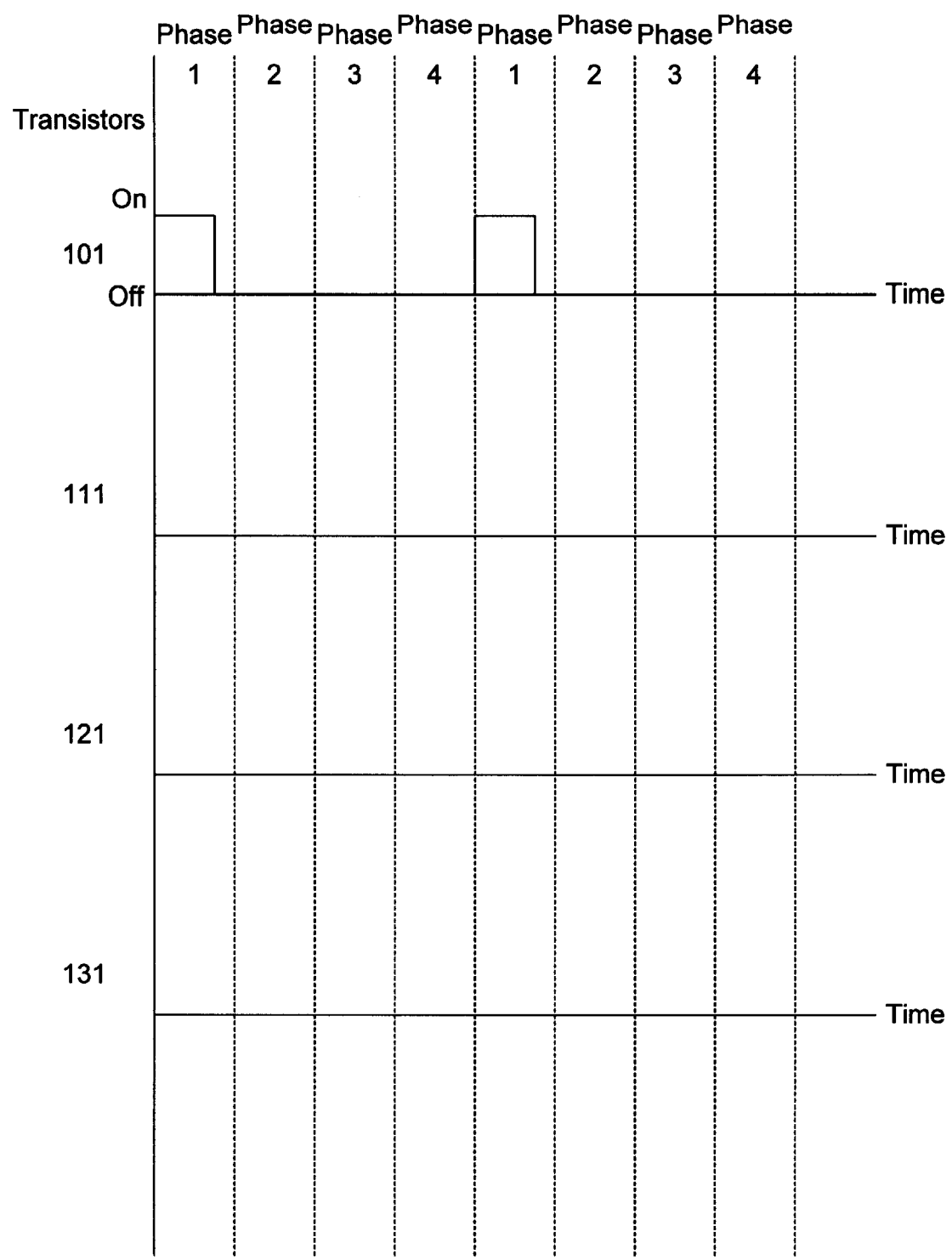
FIG. 4 is a timing diagram illustrating the duty cycles of selected transistors of FIG. 1 during a low power mode of operation.

FIGS. 2–4 illustrate aspects of the operation of multiphase power supply 100. FIGS. 2 and 3 are timing diagrams illustrating exemplary duty cycles associated with transistors 101, 111, 121 and 131 during a normal mode of operation. FIG. 4 is a timing diagram illustrating exemplary duty cycles associated with transistors 101, 111, 121 and 131 during a low power mode of operation.

Turning collectively to FIGS. 1 and 2, phase control circuit 150 activates (i.e. turns on) transistors 101,111,121 and 131, respectively, during different phases of operation. During a first phase of operation ("phase 1"), transistor 101 is turned on while transistors 111, 121 and 131 are turned off. Since each switching regulator 110 is embodied as a synchronous regulator, when transistor 101 is turned on, transistor 102 is turned off (in response to a corresponding control signal from phase control circuit 150). Thus, during phase 1, current flows from Vcc through transistor 101 and inductor 104 to charge capacitor 105. Also during phase 1, transistors 111, 121 and 131 are turned off, and transistors 112, 122 and 132 are turned on.

During the next phase of operation ("phase 2"), phase control circuit 150 turns off transistor 101 and turns on transistor 102. When transistor 102 is turned on and transistor 101 is turned off, current may continue to temporarily flow through inductor 104 to charge capacitor 105 since current flow through inductor 104 cannot change instantaneously. Transistor 102 provides a return path for this current.

Also during phase 2, transistor 111 of switching regulator 10B is turned on and transistor 112 is turned off. Consequently, similar to the previous discussion, capacitor 115 is charged by current flow from Vcc through transistor 111. Subsequent operations of switching regulators 510C and 510D during phases 3 and 4 are similar.

Phase control circuit 150 may be further configured to monitor the output voltage, Vout, at node 170 via a feedback control signal and adjust accordingly the duty cycle of transistors 101, 111, 121 and 131 to maintain a constant voltage level. FIG. 3 illustrates an exemplary situation where the duty cycle of transistors 101, 111, 121 and 131 of FIG. 1 is lessened due to, for example, reduced current draw by microprocessor 160. The duty cycle of transistors 101, 111, 121 and 131 would increase relative to the example of FIG. 2 if there were a decreased output voltage at node 170, i.e., due to increased current draw by microprocessor 160.

As stated previously, microprocessor 160 is configured to operate in a low power mode of operation. During such mode of operation, microprocessor 160 requires less current. The low power mode of operation may be controlled by, for example, a power management unit (not shown) which detects certain system inactivity, as desired. Phase control circuit 150 is configured to selectively suspend operation of a subset of switching regulators 110 (e.g. switching regulators 110B, 110C and 110D) upon assertion of a low power mode control signal which indicates that microprocessor 160 is currently operating in a low power mode. The low power mode control signal may be received from the power management unit. As depicted in FIG. 4, in this embodiment, phase control circuit 150 suspends operation of switching regulator circuits 110B, 110C and 110D during the low power mode by removing (or otherwise driving or disabling) the control signals provided to the associated switching transistors 111, 112, 121, 122, 131 and 132 such that the transistors are held in an off state. During this mode, switching regulator 110A operates in its normal manner as described previously.

Figure 5:
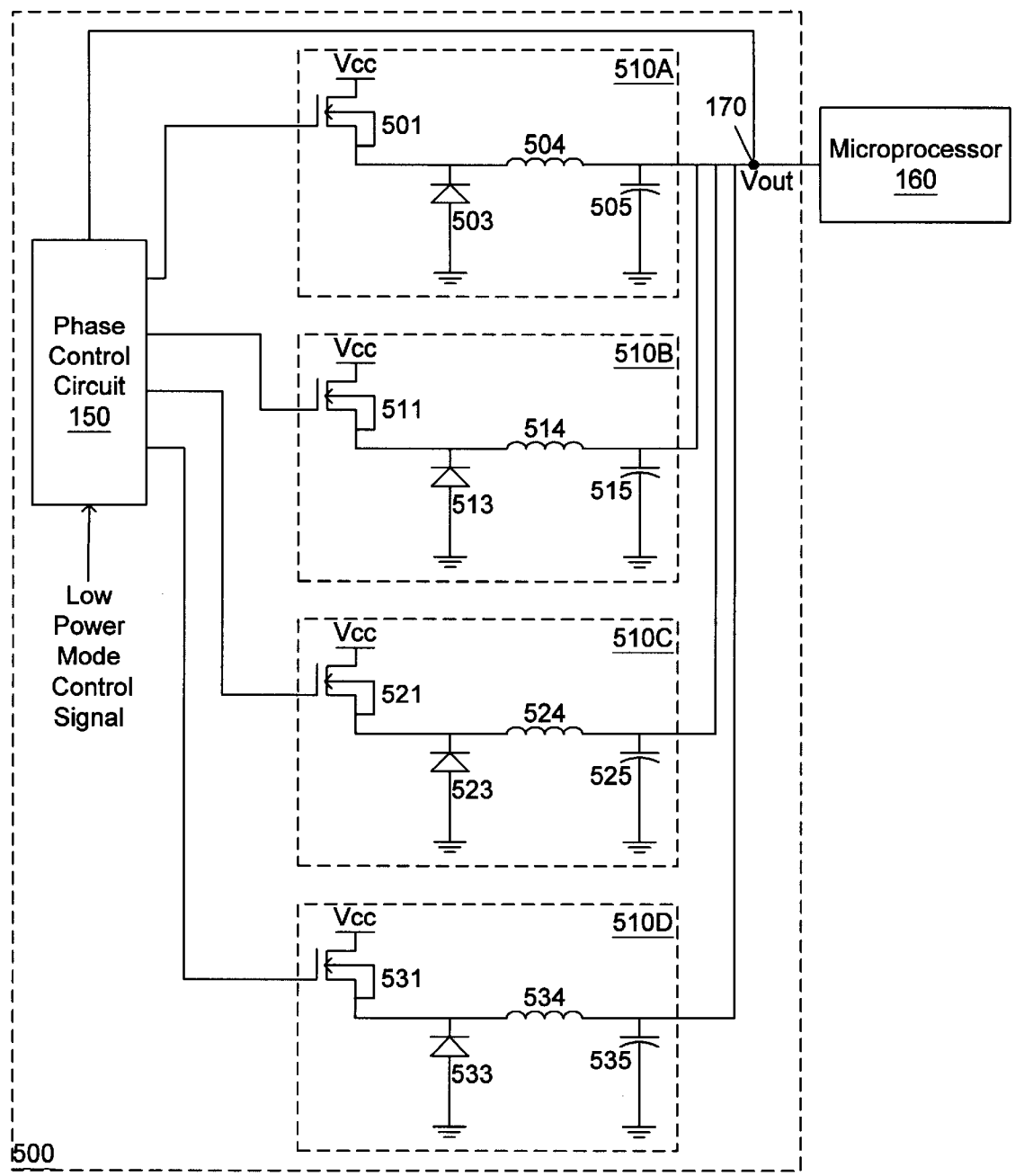
FIG. 5 illustrates another embodiment of a multiphase power supply.

FIG. 5 illustrates another embodiment of a multiphase power supply 500. Multiphase power supply 500 of FIG. 5 differs from multiphase power supply 100 of FIG. 1 in that transistors 102, 112, 122 and 132 have been omitted. Thus, the switching regulators, e.g. 510A, 510B, 510C and 510D, of FIG. 5 are not synchronous regulators. A respective diode i.e., diode 503, 513, 523 or 533, of each switching regulator 510 provides a return path for current to flow when the associated transistor, i.e., transistor 501, 511, 521 or 531, is turned off.

Various embodiments of the multiphase power supply may advantageously allow for relatively high current capabilities during a normal mode of operation, while minimizing losses during the low power mode of operation. By suspending operation of a subset of switching regulators during the low power mode of operation, capacitive switching losses associated with the transistors of the suspended switching regulators may be eliminated. Therefore, overall efficiency of the power supply may be improved.

It is noted that while in the above described embodiments, a total of four switching regulators are depicted in each of the power supplies, other embodiments are possible where other numbers of switching regulators may be provided. Similarly, while in the above described embodiments during the low power mode of operation all but one of the switching regulators is suspended from operation, other embodiments are possible where any number of switching regulators may be suspended.

Numerous variations and modifications will become apparent to those skilled in the art once the above disclosure is fully appreciated. It is intended that the following claims be interpreted to embrace all such variations and modifications.

What is claimed is:

1. A power supply comprising:
    a first switching regulator circuit;
    a second switching regulator circuit;
    a phase control circuit coupled to said first switching regulator circuit and to said second switching regulator circuit, wherein said phase control circuit is configured to generate a plurality of switching control signals for controlling switching of said first and second switching regulator circuits, wherein said phase control circuit is configured to selectively suspend operation of said second switching regulator in response to receiving a signal indicative of a low power mode of operation while said first switching regulator circuit continues to operate.

2. The power supply as recited in claim 1, wherein said first switching regulator circuit and said second switching regulator circuit are configured to provide power to an output node, and said first switching regulator circuit continues to provide power to said output node when operation of said second switching regulator circuit is suspended by said phase control circuit.

3. The power supply as recited in claim 2, wherein said phase control circuit selectively suspends operation of said second switching regulator circuit during said low power mode of operation by disabling at least one of said plurality of control signals to said second switching regulator circuit.

4. The power supply as recited in claim 3, wherein each of said first and second switching regulator circuits comprises a first transistor and a second transistor, wherein said phase control circuit selectively activates and deactivates said first and second transistor with said control signals.

5. The power supply as recited in claim 4, wherein said phase control circuit selectively activates and deactivates said first and second switching regulator circuits so that said first and second switching regulator circuits are out of phase with respect to one another.

6. The power supply as recited in claim 5, wherein each of said first and second switching regulator circuits further comprises:
   a capacitor coupled to receive charge from said first transistor in response to said first transistor being activated; and
   an inductor coupled to said capacitor to provide current to said capacitor in response to said first transistor being deactivated.

7. The power supply as recited in claim 3, wherein each of said first and second switching regulator circuits comprises a first transistor, wherein said phase control circuit selectively activates and deactivates said first transistor.

8. The power supply as recited in claim 7, wherein said phase control circuit selectively activates and deactivates said first and second switching regulator circuits so that said first and second switching regulator circuits are out of phase with respect to one another.

9. The power supply as recited in claim 8, wherein each of said first and said second switching regulator circuits further comprises:
   a capacitor coupled to receive charge from said first transistor in response to said first transistor being activated; and
   an inductor coupled to said capacitor to provide current to said capacitor in response to said first transistor being deactivated.

10. A power supply comprising:
   a first switching regulator circuit;
   a second switching regulator circuit;
   a third switching regulator circuit;
   a fourth switching regulator circuit;
   a phase control circuit coupled to said first switching regulator circuit, said second switching regulator circuit, said third switching regulator circuit and said fourth switching regulator circuit, wherein said phase control circuit is configured to generate a plurality of switching control signals for controlling switching of said first, second, third and fourth switching regulator circuits, wherein said phase control circuit is configured to selectively suspend operation of said second, third and fourth switching regulator circuits in response to receiving a signal indicative of a low power mode of operation while said first switching regulator circuit continues to operate.

11. The power supply as recited in claim 10, wherein said first switching regulator circuit, said second switching regulator circuit, said third switching regulator circuit and said fourth switching regulator circuit, are configured to provide power to an output node, and said first switching regulator circuit continues to provide power to said output node when operation of said second switching regulator circuit, said third switching regulator circuit and said fourth switching regulator circuit is suspended by said phase control circuit.

12. The power supply as recited in claim 11, wherein said phase control circuit selectively suspends operation of said second, third and fourth switching regulator circuits during said low power mode of operation by disabling at least one of said plurality of control signals to each of said second, third and fourth switching regulator circuits.

13. The power supply as recited in claim 12, wherein each of said first, second, third and fourth switching regulator circuits comprises a first transistor and a second transistor, wherein said phase control circuit selectively activates and deactivates said first and second transistor with said control signals.

14. The power supply as recited in claim 13, wherein said phase control circuit selectively activates and deactivates said first, second, third and fourth switching regulator circuits so that said first, second, third and fourth switching regulator circuits are out of phase with respect to one another.

15. The power supply as recited in claim 14, wherein each of said first, second, third and fourth switching regulator circuits further comprises:
   a capacitor coupled to receive charge from said first transistor in response to said first transistor being activated; and
   an inductor coupled to said capacitor to provide current to said capacitor in response to said first transistor being deactivated.

16. The power supply as recited in claim 12, wherein each of said first, second, third and fourth switching regulator circuits comprises a first transistor, wherein said phase control circuit selectively activates and deactivates said first transistor.

17. The power supply as recited in claim 16, wherein said phase control circuit selectively activates and deactivates said first, second, third and fourth switching regulator circuits so that said first, second, third and fourth switching regulator circuits are out of phase with respect to one another.

18. The power supply as recited in claim 17, wherein each of said first, second, third and fourth switching regulator circuits further comprises:
   a capacitor coupled to receive charge from said first transistor in response to said first transistor being activated; and
   an inductor coupled to said capacitor to provide current to said capacitor in response to said first transistor being deactivated.

19. A computer system comprising:
   a microprocessor;

a power supply coupled to said microprocessor, wherein said power supply comprises:
a first switching regulator circuit;
a second switching regulator circuit;
a phase control circuit coupled to said first switching regulator circuit and to said second switching regulator circuit, wherein said phase control circuit is configured to generate a plurality of switching control signals for controlling switching of said first and second switching regulator circuits, wherein said phase control circuit is configured to selectively suspend operation of said second switching regulator in response to receiving a signal indicative of a low power mode of operation while said first switching regulator circuit continues to operate.

20. The computer system as recited in claim 19, wherein said first switching regulator circuit and said second switching regulator circuit are configured to provide power to said microprocessor, and said first switching regulator circuit continues to provide power to said microprocessor when operation of said second switching regulator circuit is suspended by said phase control circuit.

21. The computer system as recited in claim 20, wherein said phase control circuit selectively suspends operation of said second switching regulator circuit during said low power mode of operation by disabling at least one of said plurality of control signals to said second switching regulator circuit.

22. The computer system as recited in claim 21, wherein each of said first and second switching regulator circuits comprises a first transistor and a second transistor, wherein said phase control circuit selectively activates and deactivates said first and second transistor with said control signals.

23. The computer system as recited in claim 22, wherein said phase control circuit selectively activates and deactivates said first and second switching regulator circuits so that said first and second switching regulator circuits are out of phase with respect to one another.

24. The computer system as recited in claim 23, wherein each of said first and second switching regulator circuits further comprises:
a capacitor coupled to receive charge from said first transistor in response to said first transistor being activated; and
an inductor coupled to said capacitor to provide current to said capacitor in response to said first transistor being deactivated.

25. The computer system as recited in claim 21, wherein each of said first and second switching regulator circuits comprises a first transistor, wherein said phase control circuit selectively activates and deactivates said first transistor.

26. The computer system as recited in claim 25, wherein said phase control circuit selectively activates and deactivates said first and second switching regulator circuits so that said first and second switching regulator circuits are out of phase with respect to one another.

27. The computer system as recited in claim 26, wherein each of said first and said second switching regulator circuits further comprises:
a capacitor coupled to receive charge from said first transistor in response to said first transistor being activated; and
an inductor coupled to said capacitor to provide current to said capacitor in response to said first transistor being deactivated.

* * * * *